(12) United States Patent
Sasaki

(10) Patent No.: US 6,823,919 B2
(45) Date of Patent: Nov. 30, 2004

(54) LAMINATION SYSTEM

(75) Inventor: Naotaka Sasaki, Kiryu (JP)

(73) Assignee: Japan Servo Co., Ltd., Toyko (JP)

( * ) Notice: Subject to any disclaimer, the term of this patent is extended or adjusted under 35 U.S.C. 154(b) by 3 days.

(21) Appl. No.: 10/107,486

(22) Filed: Mar. 28, 2002

(65) Prior Publication Data

US 2002/0139485 A1 Oct. 3, 2002

(30) Foreign Application Priority Data

Mar. 30, 2001 (JP) ........................................ 2001-098097

(51) Int. Cl.$^7$ ............................................ B32B 31/00
(52) U.S. Cl. ........................ 156/517; 156/353; 156/354; 156/361; 156/362; 156/363; 156/379.8; 156/521
(58) Field of Search ................................ 156/350, 353, 156/354, 361–363, 379.8, 517, 521, 555

(56) References Cited

U.S. PATENT DOCUMENTS

| 5,783,024 A | 7/1998 | Forkert |
| 5,807,461 A | 9/1998 | Hagstrom |
| 6,159,327 A | * 12/2000 | Forkert ........................ 156/264 |

* cited by examiner

Primary Examiner—Chris Fiorilla
Assistant Examiner—Michelle Acevedo Lazor
(74) Attorney, Agent, or Firm—Birch, Stewart, Kolasch & Birch, LLP

(57) ABSTRACT

A lamination system comprises; a film transfer means for transferring along a film transfer path a laminate film in which small windows are provided, a film detection sensor for detecting the laminate film, a cutting means for cutting the laminate film into a predetermined length. The film transfer means further transfers the cut laminate film along the film transfer path, the lamination system further comprises a card transfer means for transferring a card on the surface of which a terminal of an IC tip is provided along a card transfer path, a positioning mean for making the terminal and the small window into a predetermined positional relation, a thermocompression bonding means for laminating laminate film with the card.

15 Claims, 5 Drawing Sheets

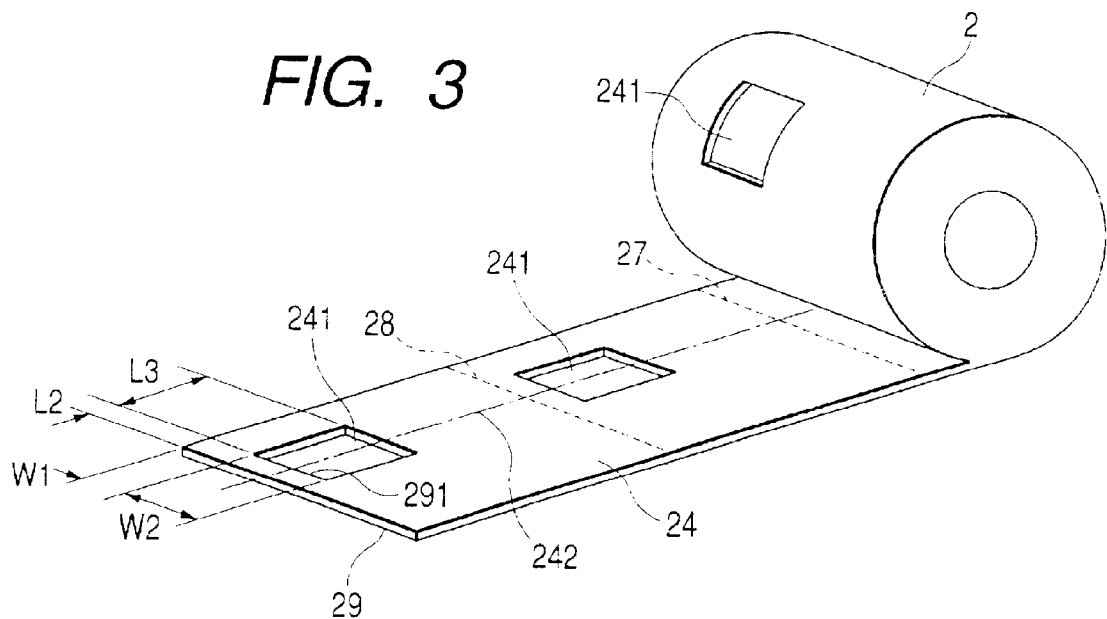
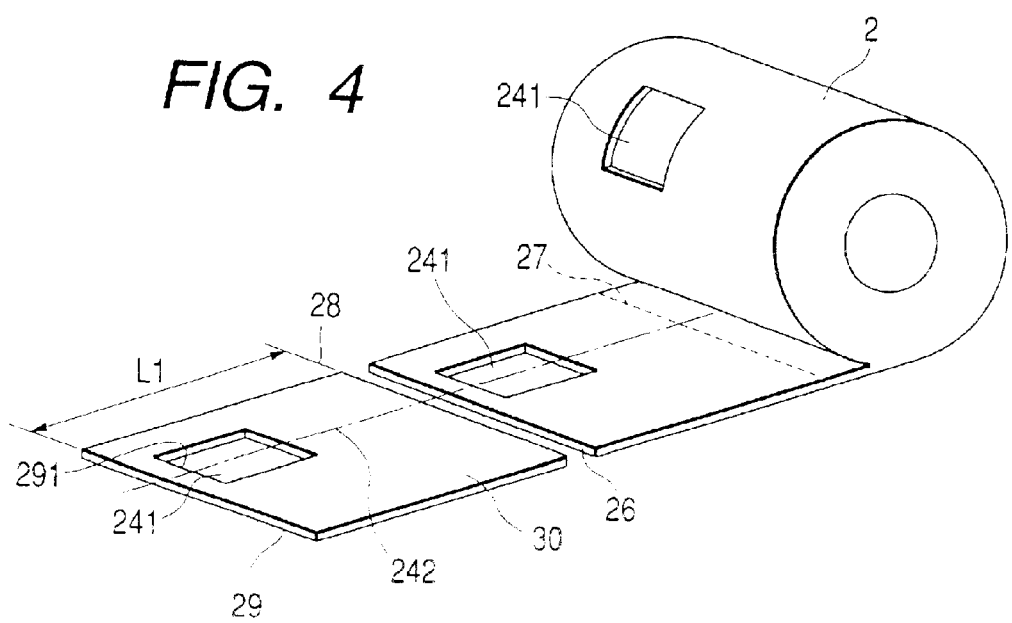

LAMINATION SYSTEM

BACKGROUND OF THE INVENTION

1. Field of the Invention

The present invention concerns a lamination method for thermocompression bonding of a transparent film on a surface of an ID card on which such as a photograph of a person and personal data are printed. More specifically, the present invention concerns a wasteless type lamination method for laminating the transparent film on the surface of a contact type IC card in which an IC tip is contained and on the surface of which a terminal connected to the IC tip is exposed.

2. Description of the Prior Art

Recently, ID cards of various type are being widely used. In order to protect an ID card from tampering or to improve the life of the ID card, a transparent film of about 30 microns in thickness is laminated by a thermocompression bonding on a surface of the ID card on which information data are printed. Lamination systems such as disclosed in U.S. Pat. No. 5,807,461 an d U.S. Pat. No. 5,783,024 are known as systems suitable for such lamination.

In the lamination system disclosed in U.S. Pat. No. 5,807,461, a transparent film pre-cut in a predetermined shape (a patch) is mounted on a carrier (a base sheet). The carrier is provided with sensor marks (index markings) for detecting the position of the pre-cut patch on the carrier. The lamination system detects the sensor mark prior to the lamination to detect the position of the pre-cut patch, then tear s the patch from the carrier and laminates the patch on the surface of the printed ID card by thermocompression bonding.

To apply this lamination system to lamination of a contact type IC card, a small window of which size is slightly larger than a size of a terminal of the IC card is provided at a predetermined place of the patch to avoid the lamination on the terminal, and lamination is practiced as explained above. In some case, a larger portion extending from a leading edge of a laminate film to an area of the terminal is removed from the laminate film, since it is difficult in the lamination to leave only the portion of the laminate film corresponding to the small window on the carrier.

In this case, there is a problem that a printed portion between the leading edge and the terminal is exposed, and accordingly, the quality of the exposed printed portion is damaged with the use of the contact type IC card.

Further, this lamination system is undesirable in view of the operation cost and the protection of environment, since the carrier is thrown away as waste material.

The latter problem was solved in a lamination system disclosed in U.S. Pat. No. 5,783,024 and the system is being practically used. In this lamination system, a leading edge of a continuous transparent laminate film is drawn out from a supply roll, then transferred along a supply path, then cut in a predetermined length, then laid on a printed ID card transferred along another supply path at the convergence zone of the two supply paths, and then laminated on the surface of the ID card by thermocompression bonding using a heat roller provided at the downstream. This lamination system, called wasteless type lamination system, is advantageous since the laminate film is used after being cut in a necessary length, and accordingly, no waste carrier such as in the lamination system disclosed in U.S. Pat. No. 5,807, 461 is left.

However, in such wasteless type lamination system as represented by U.S. Pat. No. 5,783,024, means for cutting the laminate film in a predetermined length while maintaining positional relationship between the leading edge of the laminate film and the small window each provided along the transfer direction with a predetermined interval is not provided. Accordingly, the lamination system can not be used for laminating contact type IC cards. Such problem prevents tamper-resistant and long life contact type IC cards from spreading.

SUMMARY OF THE INVENTION

It is an object of the present invention to solve the above problem in the prior art and to provide a lamination method that can be applied for lamination of contact type IC cards, and that is excellent in operationability.

A lamination method according to the present invention to achieve the object comprises providing a laminate film with a heated adhesive layer where the laminate film has small windows and is drawn out from a supply roll. The laminate film is transferred along a film transfer path. A film detection sensor is also provided along the film transfer path to detect the laminate film. The laminate film is cut into a Predetermined length after being detected by the film detection sensor. The cut laminate film is transferred along the film transfer path. A card having a terminal on a surface connected to an IC tip contained in said card is transferred along a card transfer path that converges with the film transfer path at a point of convergence. The terminal on the surface of the card is positioned with the small window of the laminate film. The cut laminate film is bonded with the card by thermocompression bonding at the point of convergence.

Further to achieve the above object, the small window is detected by the film detection sensor, based on the result of which the laminate film is controlled to be transferred to make a leading edge of the laminate film and the small window into the predetermined positional relation, and while cutting the laminate film successively by the cutting means, lamination is made successively.

Further to achieve the above object, a process when the small window is detected by the film detection sensor, based on which the laminate film is controlled to be transferred to make the leading edge of the laminate film and the small window into the predetermined positional relation, then the laminate film is cut, and another process when the small window is not detected by the film detection sensor, the laminate film is cut into the predetermined length indepedently of the predetermined positional relation, are shifted automatically.

In the lamination method as above, it is possible to laminate the cut laminate film from which only the portion in close vicinity to the terminal portion of the printed IC card is removed on the printed IC card. Accordingly, it is possible to realize the lamination method by which the quality of the printed data around the terminal of the IC card can be maintained in a long time, and by which the tamper-resistance and the life of contact type IC card can be improved without yielding waste materials.

Further, since the cut laminate film with or without the small window can be recognized automatically, it is possible to automatically change the lamination system for a contact type IC card into for ordinary ID card, or vice versa, without a manual operation by an operator and accordingly, the operationability is raised.

BRIEF DESCRIPTION OF THE DRAWINGS

FIG. 3 is a schematic perspective view of an example of a supply roll of a continuous laminate film with a small window, suitable for use in the practice of the present invention.

FIG. 4 is a schematic perspective view of the supply roll of the continuous laminate film in FIG. 3 after the laminate film has been cut from the supply roll.

DETAILED DESCRIPTION OF THE INVENTION

Figure 1:
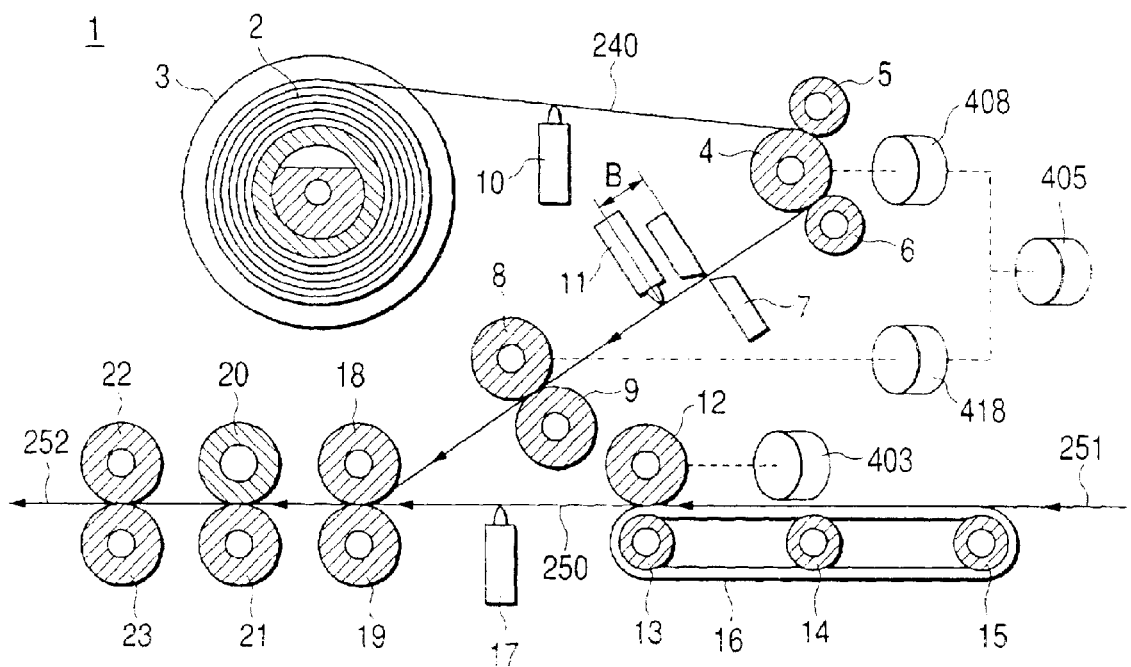
FIG. 1 shows a construction of a lamination system according to the present invention.

A lamination system 1 according to the present invention is shown in FIG. 1. A transparent continuous laminate film is loaded in a form of a supply roll 2 on a supply spindle 3 and is transferred along a film transfer path 240. A laminate film supply monitoring sensor 10 composed of an optical sensor represented by a reflective type optical sensor is provided along the film transfer path 240 and monitoring the supply of the continuous laminate film. The continuous laminate film is hung on a roller 4 composing a first transfer means, then passed between two cutting blades of a cutter 7, then transferred under a film detection sensor 11 composed of an optical sensor also represented by a reflective type optical sensor, and then transferred thorough a second transfer means composed of a roller 8 and roller 9. The first transfer means and the second transfer means compose a film transfer means. A distance B between the cutter 7 and the film detection sensor 11 is predetermined as a design factor of the system.

On the other hand, a printed IC card is put into an inlet 251 of the lamination system 1. Then, the printed IC card is transferred on a belt 16 driven by rollers 13 to 15, then transferred along a card transfer path 250 being held by the belt 16 located on the roller 13 and a roller 12 opposing to the belt 16, and then transferred to a point of convergence, composed of a roller 18 and a roller 19, at which the film transfer path 240 and the card transfer path 250 converge, after being positioned for registration by a card edge detection sensor 17 composed of an optical sensor also represented by a reflective type optical sensor. The rollers 12 to 15 and the belt 16 compose a card transfer means.

Drive force of a laminate film transfer motor 405 is transmitted to the roller 4 through a laminate load electric clutch 408. The drive force is transmitted to rollers 5 and 6 through the roller 4 and the respective gears (not illustrated). Similarly, the drive force Is transmitted to a roller 8 through a laminate feed electric clutch 418, and from the roller 8 to a roller 9 through a gear (not illustrated).

In this embodiment, a stepping motor is adopted as the laminate film transfer motor 405. Since an amount of rotation of a stepping motor can be precisely and easily controlled by controlling a number of drive pulses, amounts of rotation of the roller 4 and the roller 8 can also be precisely and easily controlled. Further, by combining on/off controls of the laminate load electric clutch 408 and the laminate feed electric clutch 418, with the control of the amounts of rotation of the rollers, transfer of the laminate film can be made minutely. A card transfer motor 403 is also provided with a card transfer system and a stepping motor is also adopted. Accordingly, transfer of a card can be minutely controlled by controlling a number of drive pulses for the card transfer motor 403. Drive force of the card transfer motor 403 is transmitted to the roller 12, and then from a drive shaft (not illustrated) of the roller 12 to rollers 13 and 18, a heat roller 20 and a roller 22 through such as gears and/or synchronous belts (not illustrated). The drive force is also transmitted from these rollers to rollers opposing to these rollers through the respective gears (not illustrated). Additionally, the laminate film transfer motor 405 can be omitted. In this case, the drive force of the card transfer motor 403 is transmitted to the rollers in the film transfer system through electric clutches. The control of the transfer of the laminate film can also be made similar to that explained above. Further, a servomotor such as a rotary encoder with a number of rotation sensor can be used as the drive source in place of the stepping motor. In this case, control of the transfer can also be made similarly to the case explained above.

Figure 2:
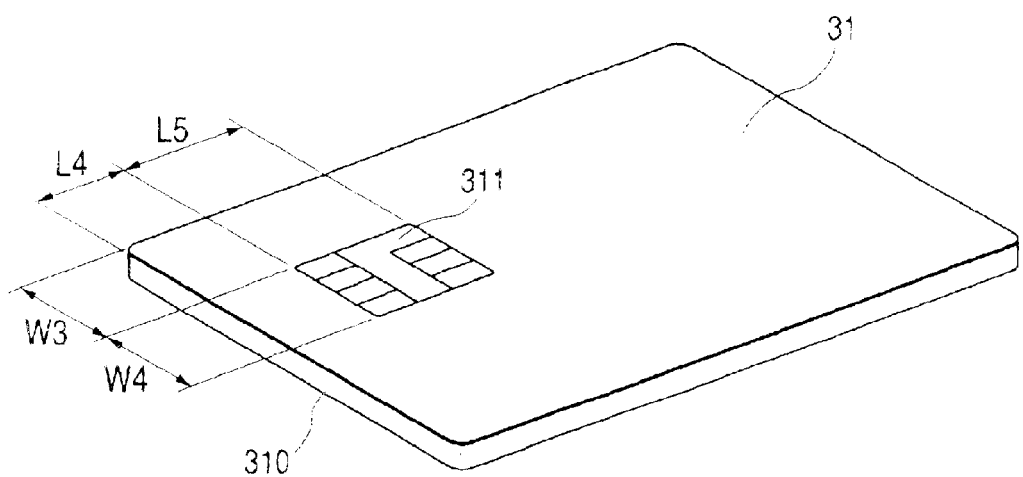
FIG. 2 is a perspective view of an example of an IC card on the surface of which lamination is to be made by the lamination system according to the present invention.

FIG. 2 shows a contact type IC card 31 on the surface of which lamination is to be made by the lamination system 1 according to the present invention. In the printed IC card 31, an IC tip (not illustrated) into/from which various data can be input/output is built-in. A terminal portion 311 electrically connected to the built-in IC tip for reading/writing data from/into the built-in IC tip is exposed on the surface of the IC card. A longitudinal length L4 and a transversal length W3 defining the location of the terminal portion 311 on the surface of the IC card is prescribed in such as ISO standard 7816-2. Also, a length L5 and a width W4 of the terminal portion 311 is prescribed in such as ISO standard 7816-2. Such as a photograph and personal data are printed on the surface of most of the IC card, excluding the terminal portion 311, by a sublimation type thermal transfer recording system for example, at the time the IC card is issued. To protect the printed data from tampering, wearing and fading, the surface of the IC card is laminated by a film. In such lamination, however, the terminal portion 311 is not allowed to be covered by an electrically resistant material, in order to maintain the function of the IC card. Additionally, an ordinary ID card in which an IC tip is not contained, the terminal portion 311 is not provided and the almost all surface is laminated after printing the data such as mentioned above.

FIG. 3 shows a supply roll 2 of a continuous laminate film 24 to be used in laminating the printed IC card 31. As shown in FIG. 3, the leading edge 29 of a continuous laminate film 24 is drawn out from the supply roll 2 and cut successively along a cutting line 28, a cutting line 27 and so forth by the cutter 7. In the continuous laminate film 24, small windows 241 are provided at a predetermined interval. Length L3 and width W2 defining the size of the small window 241 are made slightly larger than the length L5 and the width W4 of the terminal portion 311, respectively. Also, a longitudinal length L2 and a transversal length W1 defining the location of the small window 241 is determined considering the location of the terminal portion 311 on the surface of the printed IC card 31. A chain line 242 in the drawing indicates a line along which the continuous laminate film 24 is scanned by the film detection sensor 11. When the continuous laminate film 24 is transferred under the detection sensor 11, the detection sensor 11 becomes to oppose to the continuous laminate film 24 including the small window 241. Additionally, the continuous laminate film 24 may be a transparent film, or may be a film treated to have a hologram surface for preventing from forgery.

FIG. 4 shows the laminate film 30 -that has been cut. As shown, the continuous laminate film 24 is cut along the cutting line 28 at a distance L1 from the leading edge 29 to make a cut laminate film 30. A cut edge 26 becomes a new leading edge of the continuous laminate film 24 to be cut next.

Now, cutting process of the continuous laminate film 24 is explained.

Figure 5:
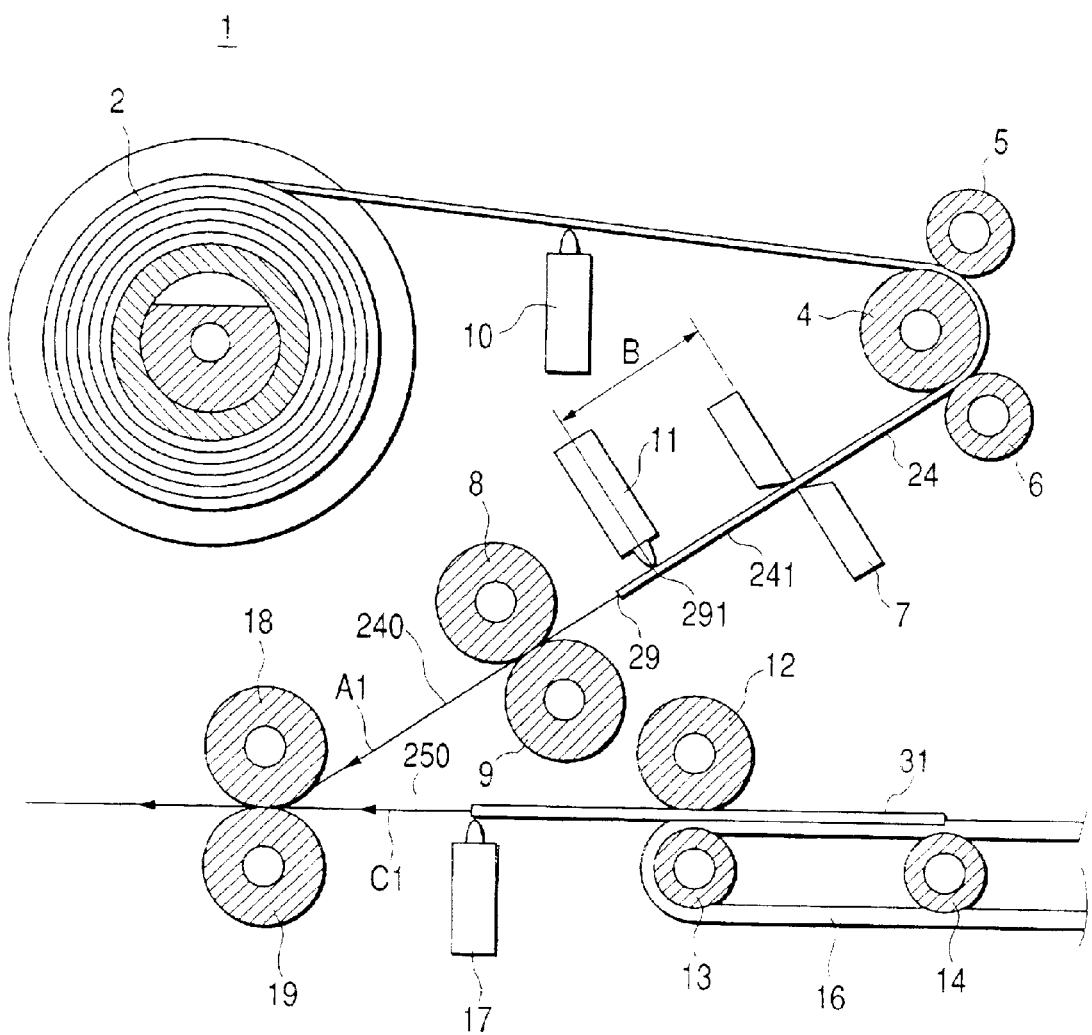
FIG. 5 shows a process for determining a cutting position prior to cutting a continuous laminate film by the lamination system according to the present invention.
Figure 6:
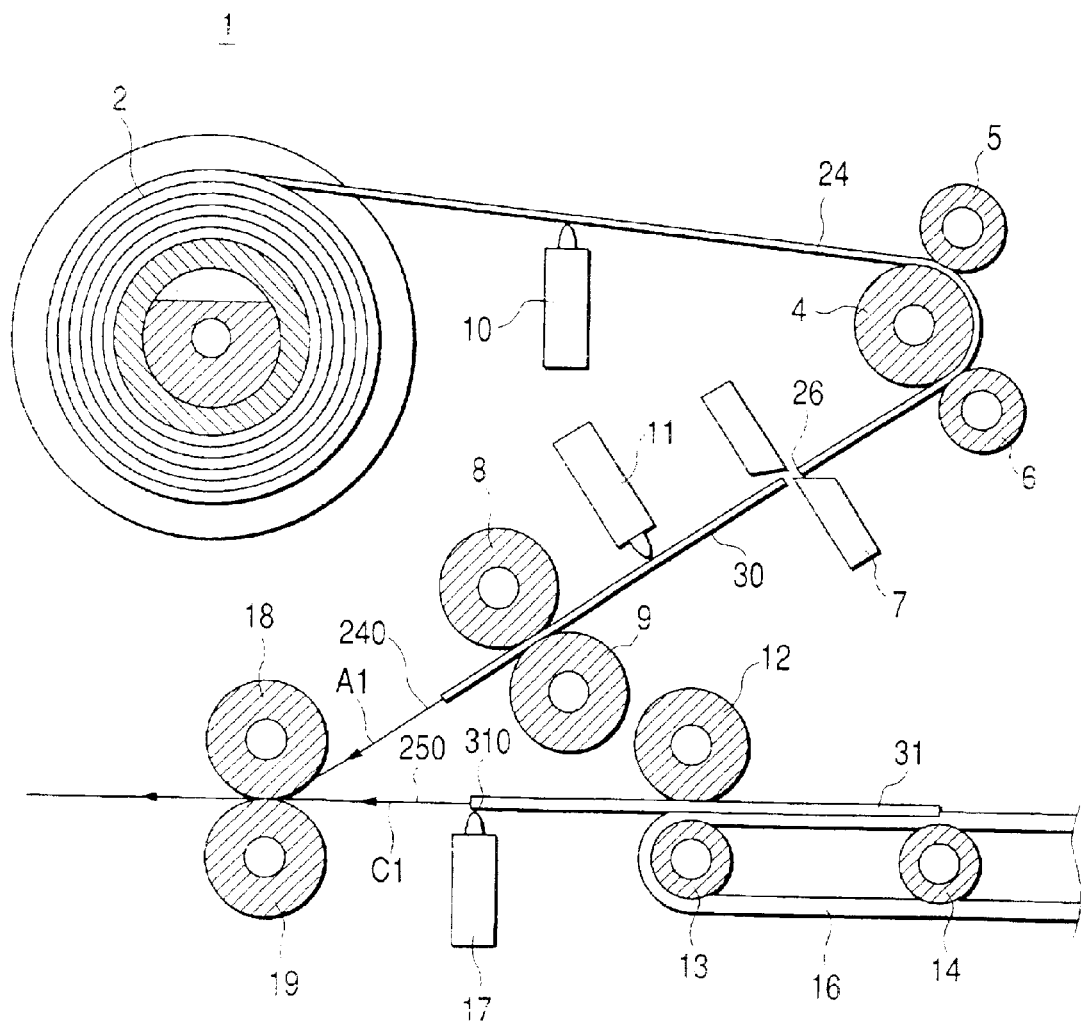
FIG. 6 shows a state in which a cutting of a laminate film is finished by the lamination system according to the present invention.

FIG. 5 shows a process for determining the cutting line before cutting the continuous laminate film 24. FIG. 6 shows a state in which cutting of the laminate film 24 has been made.

In the following explanation, both of the laminate load electric clutch 408 and the laminate feed electric clutch 418 shown in FIG. 1 are activated to be capable of transmitting drive forces. When the leading edge 29 of the continuous laminate film 24 drawn out from a supply roll 2, being driven by the laminate film transfer motor 405, is detected by the film detection sensor 11, an output signal of the film detection sensor 11 is activated. Then, in order to determine a position on the laminate film 24 at which the laminate film 24 is to be cut, the lamination system 1 transmits drive command pulse to the laminate film transfer motor 405 to transfer the laminate film 24 by a distance slightly longer than the distance L2 between the leading edge 29 of the laminate film 24 and a leading edge 291 of the small window 241, while examining if the output signal of the detection sensor 11 changes from being activated into inactivated.

If the small window 241 is provided with the laminate film 24, the output signal of the detection sensor 11 changes from being activated into inactivated at the time when the leading edge 291 of the small window 241 passes under the detection sensor 11. Accordingly, at the time when the output signal of the detection sensor 11 changes from being activated into inactivated, drive command pulses to drive the laminate film transfer motor 405 to transfer the laminate film 24 by a distance corresponding to (L1-L2-B) from the position at which the change in the signal occurred, are transmitted. After that, the laminate film transfer motor 405 is stopped to stop the transfer of the laminate film 24. Then, the cutter 7 is driven to cut the laminate film 24, and a cut laminate film 30 is made on a film transfer path 240, as shown in FIG. 6. After that, the laminate load electric clutch 408 is inactivated and the laminate film transfer motor 405 is started. Then, the drive force of the laminate film transfer motor 405 is transmitted to the rollers 8 and 9 through the laminate feed electric clutch 418, and the cut laminate film 30 is transferred in the direction indicated by an arrow A1.

In the above process, if the leading edge 291 of the small window 241 is not detected, then the lamination system 1 judges that the laminate film 24 without the small window 241 is being used. Then, the laminate film 24 is transferred by the distance corresponding to (L1-B) after the leading edge 29 of the laminate film 24 is detected, and then cut by the cutter 7.

In the embodiment as explained above, whether the leading edge 291 is provided or not is judged by the detection sensor 11. Alternatively, the judgement can also be made in advance by the laminate film supply monitoring sensor 10 and the system can be made simpler. In this case, if the leading edge 291 is detected by the laminate film supply monitoring sensor 10, then the transfer control of the laminate film 24 is made, based on the result of the detection, to make the distance between the leading edge 29 of the laminate film 24 and the leading edge 291 of the small window 241 be a predetermined value. After that, the cutting of the laminate film 24 and successive lamination is made successively.

Additionally, in the embodiment as explained above, the leading edge 291 of the small window 241 is used as the reference point to determine the cutting position of the laminate film 24. Alternatively, a trailing edge of the small window 241 can be used as the reference point, if the transfer control of the laminate film 24 after detection of the trailing edge is modified accordingly.

On the other hand, the printed IC card 31 is transferred along a card transfer path 250 shown in FIG. 6 in a direction indicated by an arrow C1. An amount of the transfer of the printed IC card 31 is controlled by the roller 12 connected to the card transfer motor 403 that is controlled by a command pulse, using a point at which a leading edge 310 of the printed IC card 31 is detected by a card edge detection sensor 17 represented by a reflective type optical sensor as the reference point. The cut laminate film 30 is laid on the printed IC card 31 at a point of convergence of the film transfer path 240 and the card transfer path 250. Then the cut laminate film 30 and the printed IC card 31 are transferred to a place between a heat roller 20 and a platen roller 21 provided at the downstream to be laminated by thermocompression bonding. After that, the printed IC card 31 on which the lamination is completed is transferred through rollers 22 and 23 to be discharge from an outlet 252.

Figure 8:
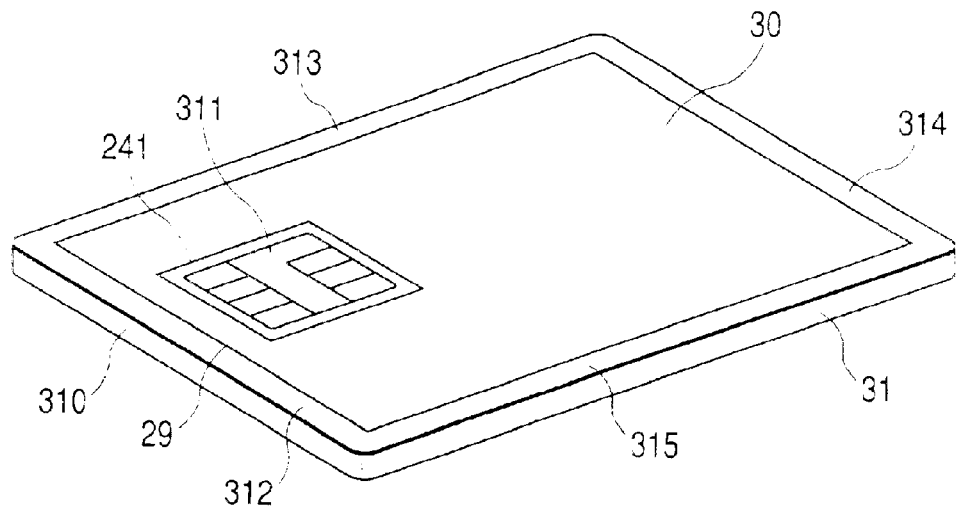
FIG. 8 is a schematic perspective view of an printed IC card on which lamination is completed by the lamination system according to the present invention.

FIG. 8 shows the printed IC card 31 on which the lamination is completed. The cut laminate film 30 is laminated by thermocompression bonding. The transfer control of the cut laminate film 30 and that of the printed IC card 31 are synchronized with each other to make small blank spaces 312 to 315 along the four sides of the printed IC card 31 as well as those between the terminal portion 311 of the printed IC card 31 and the small window 241 of the cut laminate film 30.

Figure 7:
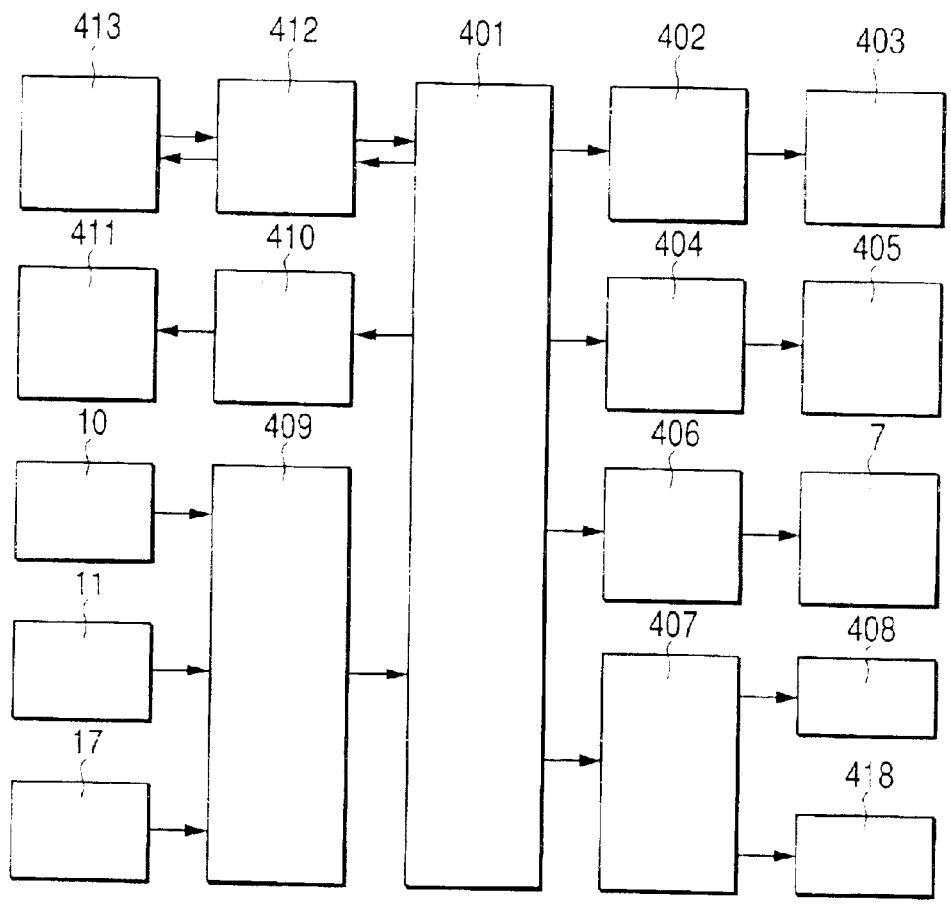
FIG. 7 is a block diagram of a controller adopted in the lamination system according to the present invention.

FIG. 7 shows a block diagram of a controller mounted in the lamination system 1. The controller comprises; a central signal processing unit 401 composed of micro processors and the like, a card transfer control circuit 402, a card transfer motor 403, a laminate film transfer control circuit 404, a laminate film transfer motor 405, a cutter drive circuit 406, a clutch drive circuit 407, a laminate load electric clutch 408, a laminate feed electric clutch 418, a sensor signal-processing circuit 409, a heater temperature control circuit 410, a heater 411, a control panel signal processing circuit 412 and a control panel 413.

The laminate load electric clutch 408 Is used to connect or disconnect driving force of the laminate film transfer motor 405 to the roller 4. The laminate feed electric clutch 418 is used to connect or disconnect driving force of the laminate film transfer motor 405 to the roller 8. The rollers 5 and 6 are connected to the roller 4 through gears provided with respective shafts (not illustrated). Also, The rollers 8 and 9 are connected with each other through gears provided with respective shafts (not illustrated). The rollers 12 to 15 provided along the card transfer path 250 are driven by the drive force of the card transfer motor 403 and transfer the IC card 31.

Operation of the controller with regard to the lamination system 1 according to the present invention is as follows:

First, the signal processing unit 401 instructs, through the laminate film transfer control circuit 404, the laminate film transfer motor 405 to rotate to draw out the continuous laminate film 24 from the supply roll 2. At the same time, the laminate load electric clutch 408 and the laminate feed electric clutch 418 are activated, the roller 4 and the roller 8 are rotated being synchronized with each other, and the laminate film 24 is transferred until the leading edge 29 reaches a responsive position of the film detection sensor 11. When the leading edge 29 of the laminate film 24 reaches the responsive position of the film detection sensor 11, the output of the film detection sensor 11 becomes activated. The activated output signal is transmitted through the sensor signal processing circuit 409 into the signal processing unit 401. The signal processing unit 401 stores temporarily the point at which the activated signal is transmitted as a position information in an internal memory and instructs the laminate film transfer motor 405 to continue the rotation while monitoring the all output of the film detection sensor 11.

If the small window 241 is provided with the laminate film 24, the output signal of the detection sensor 11 a changes from being activated into inactivated at the time when the leading edge 291 of the small window 241 passes under the detection sensor 11. Then, the signal processing unit 401 stores temporarily the point at which the activated signal is transmitted as the position information in the internal memory. Based on the position information, the signal processing unit 401 computes (L1-L2-B) and transmits, through the laminate film transfer control circuit 404, the drive command pulses to the laminate film transfer motor to 405 transfer the laminate film 24 by the distance corresponding to the result of the computation, and then to stop. Then, the cutter 7 is driven to cut the laminate film 24, and the cut laminate film 30 is made on the film transfer path 240. After that, the laminate load electric clutch 408 that has been activated by the clutch drive circuit 407 is inactivated, the drive force of the laminate film transfer motor 405 is transmitted to the rollers 8 and 9 through the laminate feed electric clutch 418, and the cut laminate film 30 is transferred, being controlled its amount of the transfer, in the direction indicated by the arrow A1.

In the above process, if the output signal of the film detection sensor 11 that detects the leading edge 291 of the small window 241 is not input into the sensor signal processing circuit 409, then the signal processing unit 401 judges that the laminate film 24 without the small window 241 is being used. Then, the signal processing unit 401 computes (L1-B) based on the position information of the leading edge 29 of the laminate film 24 that has been temporarily stored, and instructs, through the laminate film transfer control circuit 404, the laminate film transfer motor 405 to transfer the laminate film 24 by the distance corresponding to the result of the computation, and then to stop. Then, the cutter 7 is driven to cut the laminate film 24, and the cut laminate film 30 Is made on a film transfer path 240. After that, the cut laminate film 30 is transferred in the control sequence similar to that explained above in the direction indicated by the arrow A1.

On the other hand, the output signal of the card edge detection sensor 17 that detects the leading edge of the printed IC card 31 is transmitted to the signal processing unit 401 through the sensor signal processing circuit 409. The point at which the leading edge of the printed IC card 31 is detected is temporarily stored as the position information in the internal memory of the signal processing unit 401 and referred to as the reference point for the succeeding control of the transfer of the printed IC card 31. Thus, the printed IC card 31 is transferred along the card transfer path 250 shown in the direction indicated by the arrow C1. The amount of the transfer of the printed IC card 31 is controlled by the roller 12 connected to the card transfer motor 403 that is controlled by a command pulse.

The cut laminate film 30 is also transferred being synchronized with the printed IC card 31 along the laminate film transfer path 240, and laid on the printed IC card 31 at the point of convergence of the film transfer path 240 and the card transfer path 250. Then the cut laminate film 30 and the printed IC card 31 are transferred to the place between the heat roller 20 and the platen roller 21 provided at the downstream. In the central portion of the heat roller 20, the heater 411 is provided. Temperature of the heater 411 is controlled by the heater temperature control circuit 410 to make the temperature at the surface of the heat roller 20 proper for the lamination. Thus, the cut laminate film 30 is certainly laminated on the surface of the printed IC card 31 by thermocompression bonding.

In the above explanation of the present invention, the explanation is made for a case in which the card transfer motor 403 and the laminate film transfer motor 405 are provided separately as the drive sources of the lamination system. However, it is quite apparent that the same effects of the present invention can be achieved using a single motor connected to a plurality of electric clutches to connect/disconnect drive force to the respective rollers. Also, although the explanation is made for a case in which the reflective type optical sensors are used as the sensors for detecting such as the laminate film and the printed IC card, it is also quite apparent that the same effects of the present Invention can be achieved using sensors of another types. Additionally, PVC are being generally used as the materials of the IC card to be laminated. The lamination system of the present invention can be used for a card made of a composite material such as PET-G, and further, the lamination system of the present invention can be used for any card regardless of the material of which the card is made. Further, the object to be laminated by the lamination system of the present invention is not limited to IC card. The lamination system of the present invention is applicable to a lamination of a continuous film, being successively cut, on a substrate in the form other than IC card by modifying such as position or form of the small window.

In the lamination system 1 as explained above, it is possible to laminate the cut laminate film 30, from which only the portion in close vicinity to the terminal portion 311 of the printed IC card 31 is removed, on the printed IC card 31. Accordingly, it is possible to realize the lamination system 1 by which the tamper-resistance and the life of contact type IC card are improved without yielding waste materials.

Further, since the cut laminate film with or without the small window can be recognized automatically, it is possible to automatically change the lamination system for a contact type IC card into for an ordinary ID card, or vice versa, without a manual operation by an operator, and accordingly, the operationability is raised.

What is claimed is:

1. A lamination method comprising:
   providing a laminate film with a heated adhesive layer, said laminate film having small windows;
   drawing out said laminate film from a supply roll;
   transferring said laminate film along a film transfer path;
   providing a film detection sensor along said film transfer path;

detecting said laminate film with said film detection sensor;

cutting said laminate film into a predetermined length after being detected by said film detection sensor;

transferring said cut laminate film along said film transfer path;

providing a card having a terminal on a surface connected to an IC tip contained in said card;

transferring said card along a card transfer path that converges with said film transfer path at a predetermined point of convergence;

positioning said terminal on said surface of said card with said small window of said laminate film; and bonding said cut laminate film with said card by thermocompression bonding at said point of convergence.

2. The method according to claim 1, further comprising:

detecting said small window by said film detection sensor;

controlling said laminate film to be transferred so that said laminate film and said small window have a predetermined positional relationship; and cutting said laminate film successively so that lamination is made successively.

3. The method according to claim 1, wherein, when said small window is detected by said film detection sensor, said laminate film is controlled to be transferred so as to bring said leading edge of said laminate film and said small window into a predetermined positional relationship, and said laminate film is cut; and wherein, when said small window is not detected by said film detection sensor, said laminate film is cut into said predetermined length independently of said predetermined positional relationship, and shifted automatically.

4. The method according to claim 1, further comprising:

forming a line along which the laminate film is scanned by the film detection sensor.

5. The method according to claim 1, wherein, when a leading edge of the laminate film is detected by the film detection sensor, an output signal is activated.

6. The method according to claim 5, further comprising:

transmitting a drive command pulse to a laminate film transfer motor to transfer the laminate film by a distance slightly longer than the distance between the leading edge of the laminate film and a leading edge of the small window while examining if the output signal of the detection sensor changes from activated to inactivated, in order to determine a position on the laminate film on which the laminate film is to be cut.

7. The method according to claim 6, wherein the lamination system determines that the laminate film without the small window is being used if the leading edge of the small window is not detected, and the laminate film is transferred by a distance corresponding to a distance from the leading edge of the cutting film and a cutting line minus the distance, between the cutter and the film detection sensor after the leading edge of the laminate film is detected.

8. The method according to claim 1, further comprising:

detecting, by a film detection sensor, a leading edge of the continuous laminate film drawn out from the supply roll and driven by a laminate film transfer motor and activating an output signal thereby.

9. The method according to claim 8, further comprising:

transmitting a drive command pulse to the laminate film transfer motor to transfer the laminate film by a distance slightly longer than the distance between the leading edge of the laminate film and the leading edge of the small window, while examining if the output signal of the detection sensor changes from activated to inactivated, in order to determine the position of the laminate film at which the laminate film is to be cut.

10. The method according to claim 9, wherein the output signal of the detection sensor changes from activated to inactivated when the leading edge of the small window passes under the detection sensor.

11. The method according to claim 10, wherein the lamination system determines that the laminate film without the small window is being used if the leading edge of the small window is not detected and the laminate film is transferred by a distance corresponding to a distance from the leading edge of the cutting film and a cutting line minus the distance between the cutter and the film detection sensor after the leading edge of the laminate film is detected and the laminate film is cut.

12. The method according to claim 1, wherein the leading edge of the small window is detected by a laminate film supply monitoring sensor, then control of the laminate film is transferred to make the distance between the leading edge of the laminate film and the leading edge of the small window to be at a predetermined value.

13. The method according to claim 12, further comprising:

transferring the cut laminate film and the printed IC card to a place between a head roller and a platen roller provided downstream so as to be laminated by thermocompression bonding.

14. The method according to claim 1, further comprising:

instructing, through a laminate film transfer control circuit, said laminate film transfer motor to rotate to draw out the continuous laminate film from the supply roll;

activating the a laminate load electric clutch and laminate feed electric clutch;

rotating in synchronism with each other rollers of the film transfer means; and transferring the laminate film until the leading edge reaches a responsive position of the film detection sensor.

15. The method according to claim 14, wherein the signal processing unit determines that the laminate film without a small window is being used if the output signal of the film detection sensor is not input into the sensor signal processing circuit and the signal processing unit computes a distance corresponding to a distance from the leading edge of the cutting film and a cutting line minus the distance between the cutter and the film detection sensor base on the position and formation of the leading edge of the laminate film that has been temporarily stored and instructs, through the laminate film transfer control circuit, the laminate film transfer motor to transfer the laminate film by the distance corresponding to the result of the computation, and then to stop.

* * * * *